US009092488B2

(12) United States Patent
Angelo et al.

(10) Patent No.: US 9,092,488 B2
(45) Date of Patent: Jul. 28, 2015

(54) DETERMINATION OF A DESIRED REPOSITORY FOR RETRIEVING SEARCH RESULTS

(75) Inventors: Michael Angelo, San Francisco, CA (US); David Braginsky, Mountain View, CA (US); Jeremy Ginsberg, San Francisco, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 234 days.

(21) Appl. No.: 13/608,991

(22) Filed: Sep. 10, 2012

(65) Prior Publication Data

US 2013/0110831 A1    May 2, 2013

Related U.S. Application Data

(63) Continuation of application No. 12/510,693, filed on Jul. 28, 2009, now Pat. No. 8,266,133, which is a continuation of application No. 11/169,285, filed on Jun. 29, 2005, now Pat. No. 7,584,177.

(51) Int. Cl.
*G06F 17/30* (2006.01)

(52) U.S. Cl.
CPC ...... *G06F 17/3053* (2013.01); *G06F 17/30864* (2013.01); *G06F 17/30867* (2013.01); *Y10S 707/99933* (2013.01); *Y10S 707/99942* (2013.01)

(58) Field of Classification Search
CPC ............. G06F 17/30864; G06F 17/30675; G06F 17/3053; G06F 17/30; G06F 17/30011; G06F 17/3064; G06F 17/30657; G06F 17/30979
See application file for complete search history.

(56) References Cited

U.S. PATENT DOCUMENTS

| 5,839,112 A | 11/1998 | Schreitmueller et al. |
| 5,960,422 A | 9/1999 | Prasad |
| 6,401,087 B2 * | 6/2002 | Yanagimoto ........................ 1/1 |
| 6,438,539 B1 | 8/2002 | Korolev et al. |
| 6,546,388 B1 | 4/2003 | Edlund et al. |
| 7,181,444 B2 | 2/2007 | Porter et al. |
| 7,246,128 B2 | 7/2007 | Jordahl |
| 7,256,530 B2 | 8/2007 | Takama |
| 7,584,177 B2 | 9/2009 | Angelo et al. |
| 8,266,133 B2 | 9/2012 | Angelo et al. |
| 2002/0019763 A1 | 2/2002 | Linden et al. |

(Continued)

FOREIGN PATENT DOCUMENTS

| JP | 10-254592 A | 9/1998 |
| JP | 2002-169823 A | 6/2002 |

(Continued)

OTHER PUBLICATIONS

"A Method of Focusing Relevancy Ranking by using Context Dependent terms Weights", 2002, IBM, 2 pages, http://www.ip.com/pubview/IPCOM000010284D, 2 pages.

(Continued)

*Primary Examiner* — Angelica Ruiz
(74) *Attorney, Agent, or Firm* — Harrity & Harrity, LLP

(57) ABSTRACT

A system receives a search query from a user and searches a group of repositories, based on the search query, to identify, for each of the repositories, a set of search results. The system also identifies one of the repositories based on a likelihood that the user desires information from the identified repository and presents the set of search results associated with the identified repository.

20 Claims, 10 Drawing Sheets

(56) References Cited

U.S. PATENT DOCUMENTS

| | | |
|---|---|---|
| 2002/0152190 A1 | 10/2002 | Biebesheimer et al. |
| 2003/0037048 A1 | 2/2003 | Kabra et al. |
| 2003/0220913 A1 | 11/2003 | Doganata et al. |
| 2005/0060310 A1* | 3/2005 | Tong et al. .................. 707/7 |
| 2005/0060311 A1 | 3/2005 | Tong et al. |
| 2005/0076003 A1 | 4/2005 | DuBose et al. |
| 2005/0289103 A1* | 12/2005 | Bier .................. 707/1 |
| 2006/0106846 A1 | 5/2006 | Schulz et al. |
| 2006/0107265 A1 | 5/2006 | Schulz et al. |
| 2006/0259480 A1 | 11/2006 | Zhang et al. |

FOREIGN PATENT DOCUMENTS

| | | |
|---|---|---|
| JP | 2002-202991 A | 7/2002 |
| JP | 2002-358324 A | 12/2002 |
| JP | 2003-167907 A | 6/2003 |
| JP | 2004-514978 A | 5/2004 |
| JP | 2006-235910 A | 9/2006 |
| KR | 10-2000-0063422 | 11/2000 |

OTHER PUBLICATIONS

Fu et al., "Analysis of Interacting BPEL Web Services", 13th World Wide Web Conference, May 2004, 10 pages.

Andrews et al., "Business Process Execution Language for Web Services", Version 1.1, Jul. 2002, http://www.ibm.com/developerworks/library/specification/ws-bepl, 136 pages.

Hansen et al., "Using Navigation Data to Improve IR Functions in the Context of Web Search", Proceedings of the 2001 ACM CIKM 10th International Conference on Information and Knowledge Management, Nov. 5-10, 2001, pp. 135-142.

International Search Report corresponding to PCT/US2006/02504 dated Nov. 16, 2006, 4 pages.

* cited by examiner

DETERMINATION OF A DESIRED REPOSITORY FOR RETRIEVING SEARCH RESULTS

RELATED APPLICATIONS

This application is a continuation of U.S. application Ser. No. 12/510,693, filed Jul. 28, 2009, which is a continuation of U.S. application Ser. No. 11/169,285, filed Jun. 29, 2005 (now U.S. Pat. No. 7,584,177), the disclosures of which are incorporated herein by reference.

BACKGROUND OF THE INVENTION

1. Field of the Invention

Implementations described herein relate generally to information retrieval and, more particularly, to the determination of a desired repository for a search.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engine systems attempt to return hyperlinks to web pages in which a user is interested. Generally, search engine systems base their determination of the user's interest on search terms (called a search query) entered by the user. The goal of a search engine system is to provide links to high quality, relevant search results (e.g., web pages) to the user based on the search query. Typically, the search engine system accomplishes this by matching the terms in the search query to a corpus of pre-stored web pages. Web pages that contain the user's search terms are "hits" and are returned to the user as links.

Some search engine systems can provide various types of information as the search results. For example, a search engine system might be capable of providing search results relating to web pages, news articles, images, merchant products, usenet pages, yellow page entries, scanned books, and/or other types of information. Typically, a search engine system provides separate interfaces to these different types of information.

When a user provides a search query to a standard search engine system, the user is typically provided with links to web pages. If the user desires another type of information (e.g., images or news articles), the user typically needs to access a separate interface provided by the search engine system.

SUMMARY OF THE INVENTION

According to one aspect, a method may include receiving a search query from a user; searching a group of repositories, based on the search query, to identify, for each of the repositories, a set of search results; identifying one of the repositories based on a likelihood that the user desires information from the identified repository; and presenting the set of search results associated with the identified repository.

According to another aspect, a system may include a search engine system that may receive a search query from a user and determine a score for each of a group of repositories, where the score for one of the repositories is based on a likelihood that the user desires information from the one repository. The search engine system may also perform a search on one or more of the repositories, based on the search query, to identify, for each of the one or more repositories, a set of search results, and provide one or more of the sets of search results based on the scores.

According to yet another aspect, a computer-readable medium to store data and computer-executable instructions is provided. The computer-readable medium may include log data associated with a number of searches of repositories based on search queries provided by users. The computer-readable medium may also include instructions for representing the log data as triples of data (u, q, r), where u refers to information regarding a user that provided a search query, q refers to information regarding the search query, and r refers to information regarding a repository from which search results were provided in response to the search query; instructions for determining a label for each of the triples of data (u, q, r), where the label includes information regarding whether the user u desired information from the repository r when the user provided the search query q; and instructions for training a model based on the triples of data (u, q, r) and the associated labels, where the model predicts whether a particular user desires information from a repository when the user provides a particular search query.

According to a further aspect, a system may include a first repository to store a first type of data, a second repository to store a second type of data, and a search engine system. The search engine system may receive a search query from a user, and determine a likelihood that the user desires information from the first or second repository based on information regarding the user, the search query, and the first or second repository.

According to another aspect, a system may include a model generation system and a search engine system. The model generation system may generate a model that determines a score associated with a likelihood that a particular user desires information from a repository when the user provides a particular search query. The search engine system may receive a search query from a user, determine a score for each of a plurality of repositories based on the model, and present search results from one or more of the repositories based on the scores.

According to yet another aspect, a method may include receiving a search query from a user; determining a score for each of a plurality of repositories, the score for one of the repositories being based on a likelihood that the user desires information from the one repository; performing a search on at least one of the repositories, based on the search query and the determined scores, to identify, for each of the at least one of the repositories, a set of search results; and providing one or more of the sets of search results.

According to a further aspect, a system may include a model generation system to generate first and second models, where at least one factor used to generate the second model is different or absent when generating the first model. The system may also include a search engine system to receive a search query from a user, determine a first score for each of a plurality of repositories based on the first model, perform a search on one or more of the repositories based on the search query and the first scores, determine a second score for each of the one or more of the repositories based on the second model, and present search results from at least one of the one or more of the repositories based on the second scores.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Figure 1:
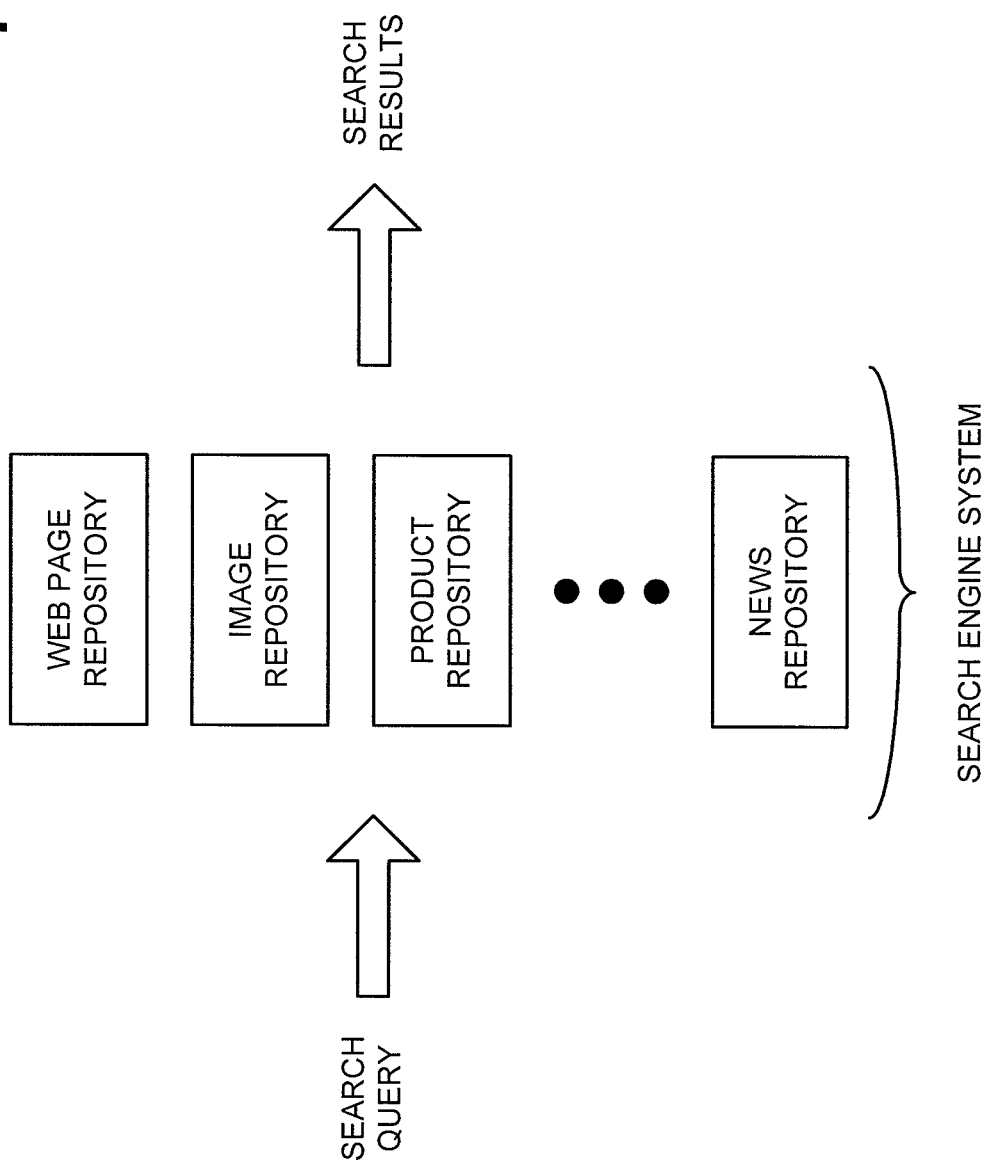
FIG. 1 illustrates a concept consistent with principles of the invention.

FIG. 1 illustrates a concept consistent with principles of the invention. A search engine system may maintain different types of information that might be desired by a user. The search engine system may maintain a set of repositories relating to the different types of information. As shown in FIG. 1, the search engine system may be associated with, for example, repositories relating to web pages, images, products, and news. The web page repository may include information relating to web pages. The image repository may include information relating to images. The product repository may include information relating to merchant products. The news repository may include information relating to news documents. The search engine system may provide separate interfaces for searches directed to specific ones of the repositories.

In the description to follow, the term "document" is to be broadly interpreted to include any machine-readable and machine-storable work product. A document may include, for example, a web page, information relating to a news event, an image file, information relating to a merchant product, information relating to a usenet page, a yellow page entry, a scanned book, a file, a combination of files, one or more files with embedded links to other files, a blog, a web advertisement, an e-mail, etc. Documents often include textual information and may include embedded information (such as meta information, hyperlinks, etc.) and/or embedded instructions (such as Javascript, etc.). A "link," as the term is used herein, is to be broadly interpreted to include any reference to/from a document from/to another document or another part of the same document.

As shown in FIG. 1, a user may provide a search query to the search engine system. The search engine system may determine which repository or repositories the user likely desires. The search engine may perform a search and present search results that include information from one or more of the repositories based on the determination of which repository or repositories the user likely desires.

For example, if a user provides the term "sunset" as a search query to the search engine system, the search engine system may determine that the user is more interested in images of sunsets rather than web pages relating to sunsets. As a result, the search engine system may present the user with search results from the image repository instead of, or in addition to, search results from other repositories.

Similarly, if a user provides the phrase "iraq war" as a search query to the search engine system, the search engine system may determine that the user is more interested in news documents relating to the Iraq war rather than web pages relating to the Iraq war. As a result, the search engine system may present the user with search results from the news repository instead of, or in addition to, search results from other repositories.

Implementations consistent with the principles of the invention may generate a model that predicts which repository, or repositories, a user is interested in when the user provides a search query, and use this model to provide relevant search results to the user.

Exemplary Model Generation System

Figure 2:
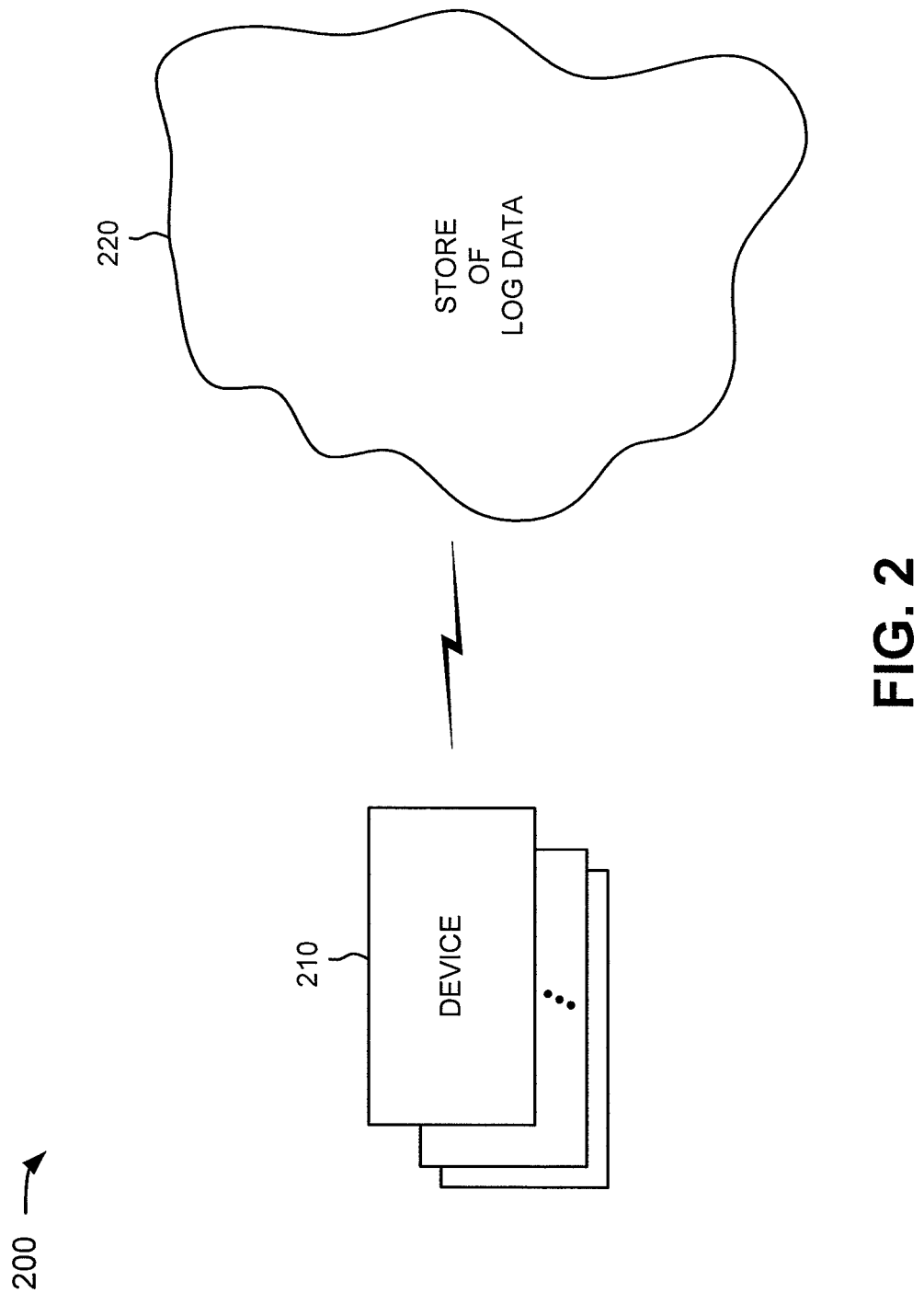
FIG. 2 is a diagram of an exemplary model generation system according to an implementation consistent with the principles of the invention.

FIG. 2 is an exemplary diagram of a model generation system 200 consistent with the principles of the invention. System 200 may include one or more devices 210 and a store of log data 220. Store 220 may include one or more logical or physical memory devices that may store a large data set (e.g., millions of instances and hundreds of thousands of features) that may be used, as described in more detail below, to create and train a model. The data may include log data concerning prior searches, such as user information, query information, and repository information, that may be used to create a model that may be used to identify one or more repositories that may be desired by a user. In one implementation, the model may predict whether a user desires information from a particular repository when the user provides a certain query.

The user information may include Internet Protocol (IP) addresses, cookie information, languages, and/or geographical information associated with the users, prior queries provided by the users, and/or the time of day and/or day of the week that the users provided the current or prior queries. The query information may include information relating to the query terms that were provided. The repository information may include information relating to the repository interfaces used for the searches, the documents that were displayed and the repositories from which they were obtained, and/or the documents that were selected (e.g., clicked on). In other exemplary implementations, other types of data may alternatively or additionally be maintained by store 220.

Device(s) 210 may include any type of computing device capable of accessing store 220 via any type of connection mechanism. According to one implementation consistent with the principles of the invention, system 200 may include multiple devices 210. According to another implementation, system 200 may include a single device 210.

Figure 3:
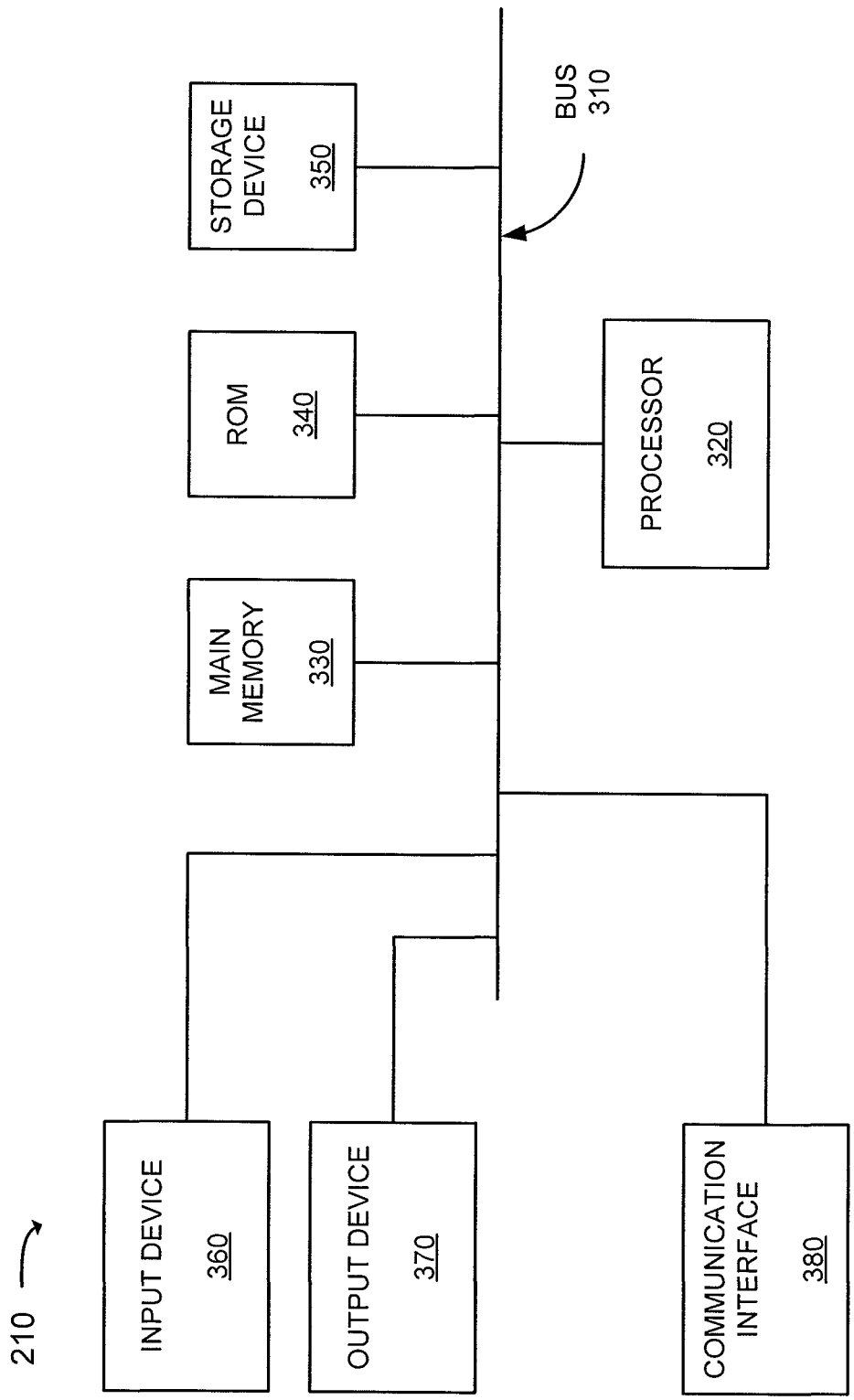
FIG. 3 is an exemplary diagram of a device of FIG. 2 according to an implementation consistent with the principles of the invention.

FIG. 3 is an exemplary diagram of a device 210 according to an implementation consistent with the principles of the invention. Device 210 may include a bus 310, a processor 320, a main memory 330, a read only memory (ROM) 340, a storage device 350, an input device 360, an output device 370, and a communication interface 380. Bus 310 may include a path that permits communication among the elements of device 210.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to device 210, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables device 210 to communicate with other devices and/or systems. For example, communication interface 380 may include mechanisms for communicating with another device 210 or store 220.

As will be described in detail below, device 210, consistent with the principles of the invention, may perform certain model generating-related operations. Device 210 may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Model Generation Processing

For purposes of the discussion to follow, the set of data in store 220 (FIG. 2) may include multiple elements, called instances. It may be possible for store 220 to include millions of instances. Each instance may include a triple of data: (u, q, r), where "u" refers to user information, "q" refers to the query that user u provided, and "r" refers to the repository from which search results were provided in response to query q. Store 220 may also store information regarding whether user u desired information from repository r when user u provided query q, where the user's desire may be measured, for example, by determining whether the user selected a document from the repository. This information will be referred to as the "label" for the instance.

Several features may be extracted for any given (u, q, r). It may be possible for store 220 to include hundreds of thousands of distinct features. In one implementation, some of these features might include one or more of the following: the country in which user u is located, the language of the country in which user u is located, a cookie identifier associated with user u, the language of query q, each term in query q, the time of day user u provided query q, the documents from repository r that were presented to user u, each of the terms in the documents from repository r that were presented to user u, and/or each of the terms in the titles of the documents from repository r that were presented to the user u. Other features might alternatively or additionally be used.

In another implementation, some of the features might include one or more of the following in addition to, or instead of, some of the features identified above: the fraction of queries that were provided to the interface for repository r, the fraction of queries that were provided to the interface for repository r versus the interfaces for other repositories, the fraction of queries that contain a term in query q that were provided to the interface for repository r versus the interfaces for other repositories, the overall click rate for queries provided to the interface for repository r, the click rate for queries provided to the interface for repository r for user u, the click rate for queries provided to the interface of repository r for users in the same country as user u, and/or the click rate for query q provided to the interface of repository r.

In a further implementation, the following two features might also be included: the click rate of query q provided to the interface of repository r for user u, and the fraction of queries q that were provided to the interface of repository r for user u. Instead of determining these features directly, models might be generated to predict these features using conventional techniques and the output of the models may be used as features.

A model may be created based on this data. In one implementation, the model may be used to predict, given a new (u, q, r), whether user u desires information from repository r if user u provided query q. As will be described in more detail below, the output of the model may be used to determine whether to search a repository, whether to include search results from a repository in a search result document, and/or the manner for presenting search results within the search result document.

Figure 4:
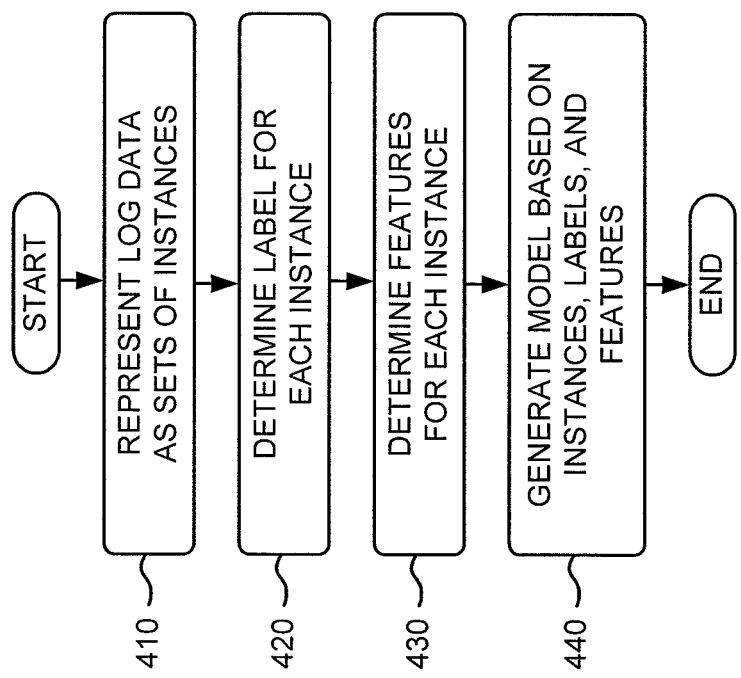
FIG. 4 is a flowchart of exemplary processing for generating a model according to an implementation consistent with the principles of the invention.

FIG. 4 is a flowchart of exemplary processing for generating a model according to an implementation consistent with the principles of the invention. This processing may be performed by a single device 210 or a combination of multiple devices 210.

To facilitate generation of the model, the log data in store 220 may be represented as sets of instances (block 410). For example, information may be identified relating to prior searches by users, such as information regarding the users, the queries the users provided, and the repositories from which the search results were obtained and/or selected. This information may be formed into triples (u, q, r), as described above.

A label for each instance may then be determined (block 420). For example, it may be determined for each triple (u, q, r) whether user u desired information (e.g., selected a document) in repository r when user u provided query q. The labels may be associated with their corresponding instances in store 220. The features relating to each of the instances may also be determined (block 430).

A model may then be generated based on the instances, labels, and features (block 440). For example, a standard machine learning or statistical technique may be used to determine the probability that user u desires information from repository r when user u provides query q:

$$P(\text{desire}|u,q,\text{show\_r}),$$

where "show_r" indicates that documents from repository r are provided. Any of several well known techniques may be used to generate the model, such as logic regression, boosted decision trees, random forests, support vector machines, perceptrons, and winnow learners. Instead of generating a probability, the model may output a value that reflects a confidence that user u desires information from repository r when user u provides query q. The output of the model will be generally referred to hereinafter as a "score," which may include a probability output and/or an output value.

As explained below, the output of the model may be used to determine whether to search a repository, whether to include search results from a repository in a search result document, and/or the manner for presenting search results within the search result document.

Exemplary Information Retrieval Network

Figure 5:
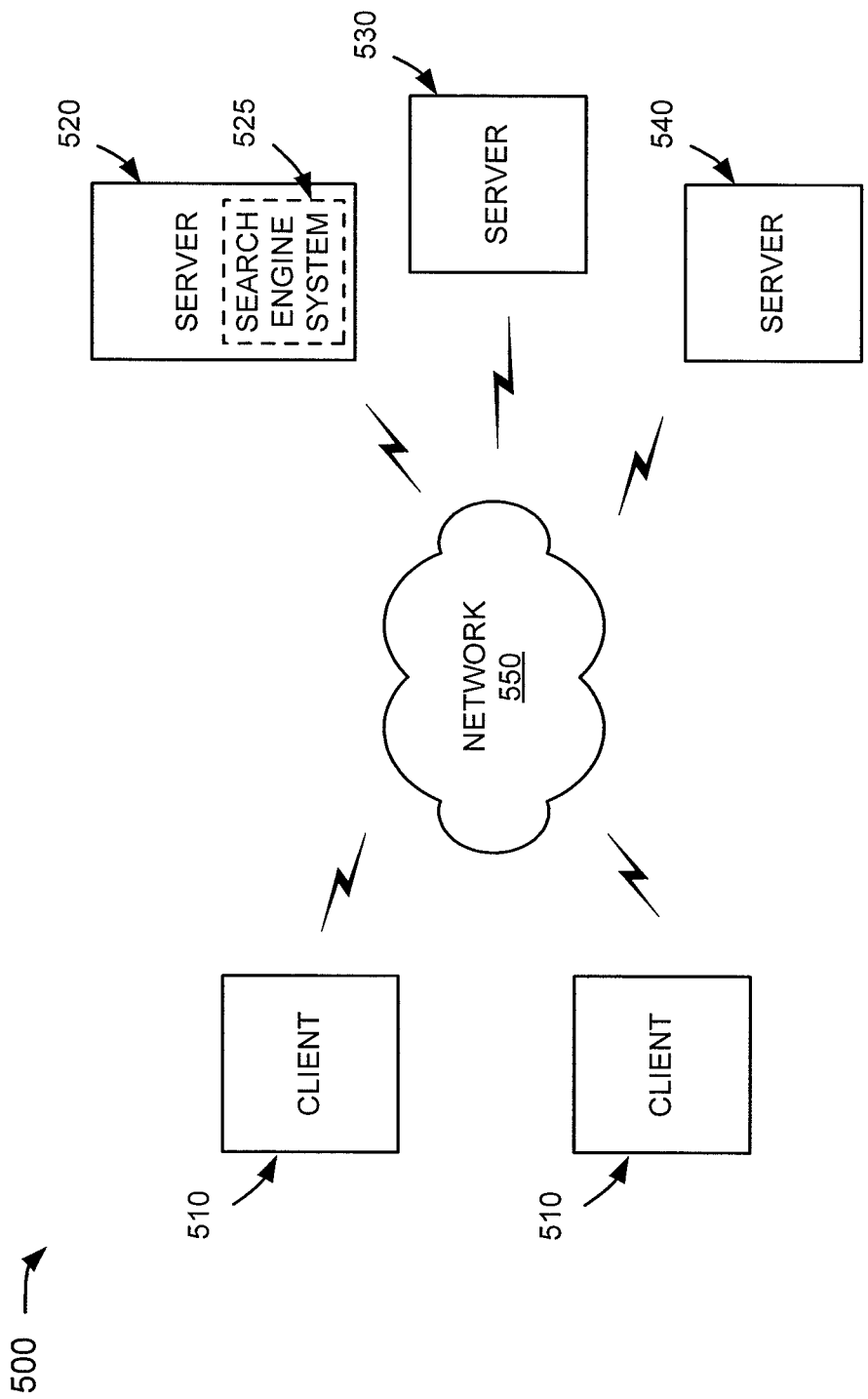
FIG. 5 is a diagram of an exemplary information retrieval network in which systems and methods consistent with the principles of the invention may be implemented.

FIG. 5 is an exemplary diagram of a network 500 in which systems and methods consistent with the principles of the invention may be implemented. Network 500 may include multiple clients 510 connected to multiple servers 520-540 via a network 550. Two clients 510 and three servers 520-540 have been illustrated as connected to network 550 for simplicity. In practice, there may be more or fewer clients and servers. Also, in some instances, a client may perform a function of a server and a server may perform a function of a client.

Clients 510 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 520-540 may include server entities that gather, process, search, and/or maintain documents in a manner consistent with the principles of the invention.

In an implementation consistent with the principles of the invention, server 520 may include a search engine system 525 usable by clients 510. Search engine system 525 may be associated with a number of repositories of documents (not shown), such as a web page repository, a news repository, an image repository, a products repository, a usenet repository, a yellow pages repository, a scanned books repository, and/or other types of repositories. These repositories may physically reside in one or more memory devices located within server 520 or external to server 520. Servers 530 and 540 may store or maintain documents that may be associated with one or more of the repositories.

While servers 520-540 are shown as separate entities, it may be possible for one or more of servers 520-540 to perform one or more of the functions of another one or more of servers 520-540. For example, it may be possible that two or more of servers 520-540 are implemented as a single server. It may also be possible for a single one of servers 520-540 to be implemented as two or more separate (and possibly distributed) devices.

Network 550 may include a local area network (LAN), a wide area network (WAN), a telephone network, such as the Public Switched Telephone Network (PSTN), an intranet, the Internet, or a combination of networks. Clients 510 and servers 520-540 may connect to network 550 via wired, wireless, and/or optical connections.

Exemplary Process for Providing Search Results

Figure 6:
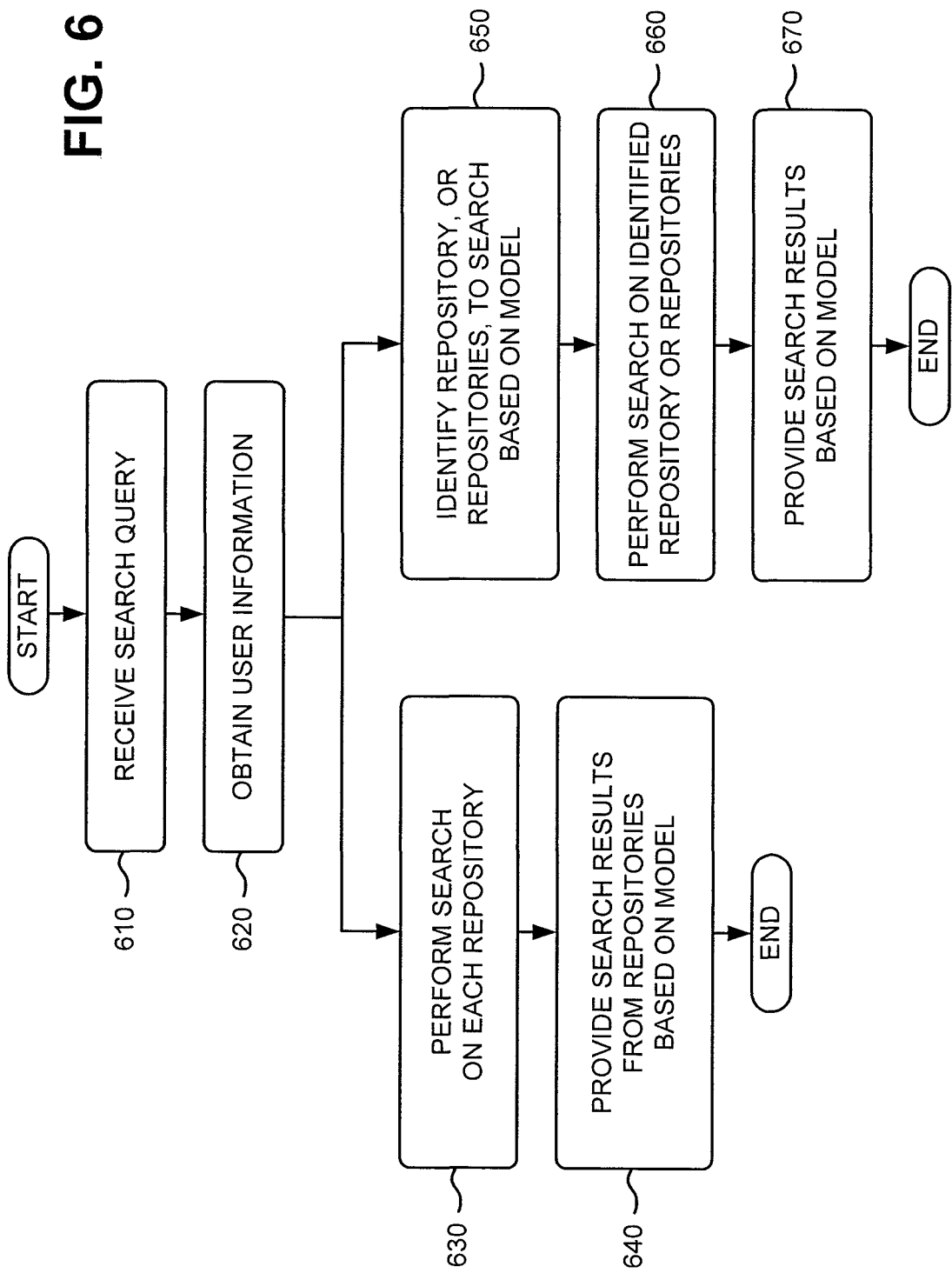
FIG. 6 is a flowchart of exemplary processing for providing search results according to an implementation consistent with the principles of the invention.

FIG. 6 is a flowchart of exemplary processing for providing search results according to an implementation consistent with the principles of the invention. Processing may begin with the receipt of a search query (block 610). For example, a user may access a search engine interface using web browser software on a client, such as client 510 (FIG. 5). The user may provide the search query to the search engine interface.

Information concerning the user may be obtained (block 620). For example, the user may be identified using, for example, an IP address, cookie information, languages, and/or geographical information associated with the user. Conventional techniques may be used for gathering the user information.

In one implementation, a search may be performed on each of the repositories based on the search query (block 630). A set of search results may be obtained corresponding to each of the repositories. Any information retrieval technique may be used to identify relevant documents to include in the set of search results.

It may then be determined how the search results will be provided based on the model (block 640). For example, information relating to the user, the search query the user provided, and each of the repositories may be used as inputs to the model. The model may be applied to each repository and the output of the model ("score") may be used to determine whether to provide search results associated with that repository. It may be determined, for example, that search results from the two repositories with the highest associated score should be provided. Alternatively, it may be determined that search results from a particular one of the repositories should always be provided and search results from another one or more repositories should also be provided if the score associated with the other one or more repositories is greater than the score associated with the particular repository. Alternatively, it may be determined that search results from repositories with associated scores above a certain threshold should be provided, and if none of the scores is above the threshold, then provide search results from the repository with the highest associated score. Yet other rules for determining whether to provide search results associated with a repository may alternatively or additionally be used.

The output of the model may alternatively, or additionally, be used to determine the manner in which the search results from the different repositories are provided. For example, it may be determined that if the score associated with a repository is below some threshold, the search results associated with the repository may be presented toward the bottom of the search result document presented to the user rather than toward the top of the search result document. Alternatively, or additionally, it may be determined that if the score associated with a repository is below some threshold, a link to the search results associated with the repository is presented instead of the search results themselves. Yet other rules for determining the manner for providing search results associated with a repository may alternatively or additionally be used.

The search results may then be arranged within a search result document and presented to the user. Each search result may include, for example, a link to a document from the corresponding repository and possibly a brief description of or excerpt from the document.

In another implementation, the repository, or repositories, to search may be identified based on the model (block 650). For example, information relating to the user, the search query the user provided, and each of the repositories may be used as inputs to the model. The model may be applied to each repository and the output of the model ("score") may be used to determine which repository to search. It may be determined, for example, that the two repositories with the highest associated score should be searched. Alternatively, it may be determined that a particular one of the repositories should always be searched and another one or more repositories should also be searched if the score associated with the other one or more repositories is greater than the score associated with the particular repository. Alternatively, it may be determined that repositories with associated scores above a certain threshold should be searched, and if none of the scores is above the threshold, then search the repository with the highest associated score. Yet other rules for determining which repository to search may alternatively or additionally be used.

A search may be performed to obtain a set of search results from each of the identified repositories (block 660). Any conventional information retrieval technique may be used to identify relevant documents to include in the set of search results.

The search results may then be provided based on the model (block 670). For example, the output of the model may be used to determine the manner in which the search results from different repositories are provided. For example, it may be determined that if the score associated with a repository is below some threshold, the search results associated with the repository may be presented toward the bottom of the search result document presented to the user rather than toward the top of the search result document. Alternatively, or additionally, it may be determined that if the score associated with a repository is below some threshold, a link to the search results associated with the repository is presented instead of the search results themselves. Other rules for determining the manner for providing search results associated with a repository may alternatively or additionally be used.

The search results may then be arranged within a search result document and presented to the user. Each search result may include, for example, a link to a document from the corresponding repository and possibly a brief description of or excerpt from the document.

In another implementation, two or more models may be used. For example, a first model may be used to determine whether to search a repository; a second model may be used to determine whether to include search results from one of the searched repositories in a search result document; and the second model, or possibly a third model, may be used to determine the manner for presenting search results within the search result document. The first, second, and/or third models may be generated based on one or more factors that differ from each other. For example, in one implementation, the output of the first model may be used as an input to the second model and/or the output of the first and/or second model may be used as an input to the third model.

It may be possible to provide information concerning this search as log data to store 220. For example, the information may be used as training data for training or refining the model.

EXAMPLE

Figure 7:
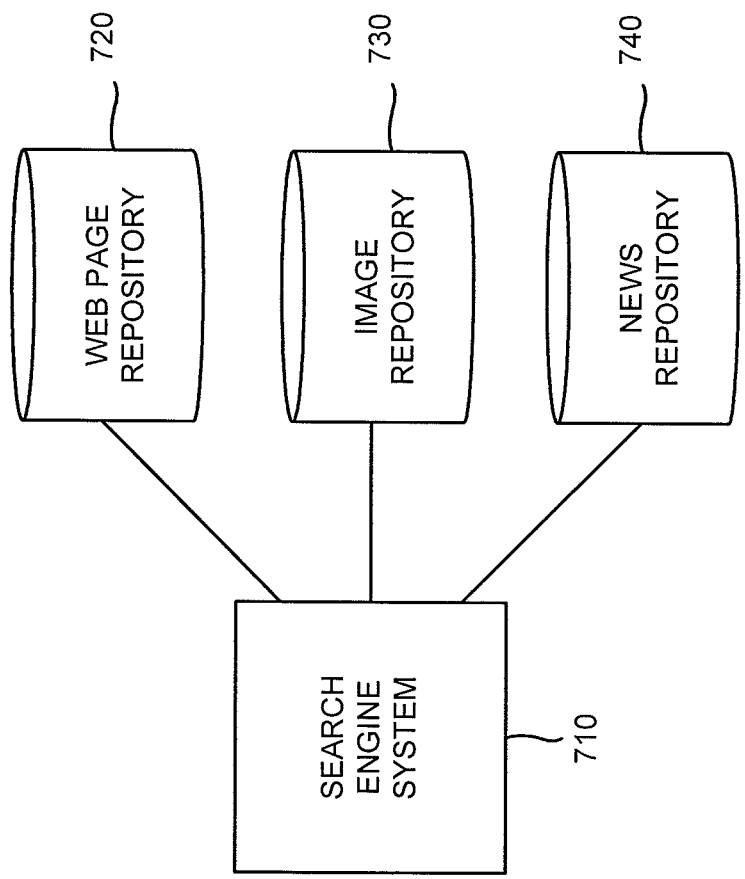
FIGS. 7-10 are diagrams of exemplary implementations consistent with the principles of the invention.

FIGS. 7-10 are diagrams of exemplary implementations consistent with the principles of the invention. As shown in FIG. 7, assume that a search engine system 710 has three associated repositories, including web page repository 720, image repository 730, and news repository 740. Web page repository 720 may store information relating to web pages. Image repository 730 may store information relating to images. News repository 740 may store information relating to news documents. Search engine system 710 may receive a search query from a user and provide relevant search results from one or more of repositories 720-740.

Figure 8:
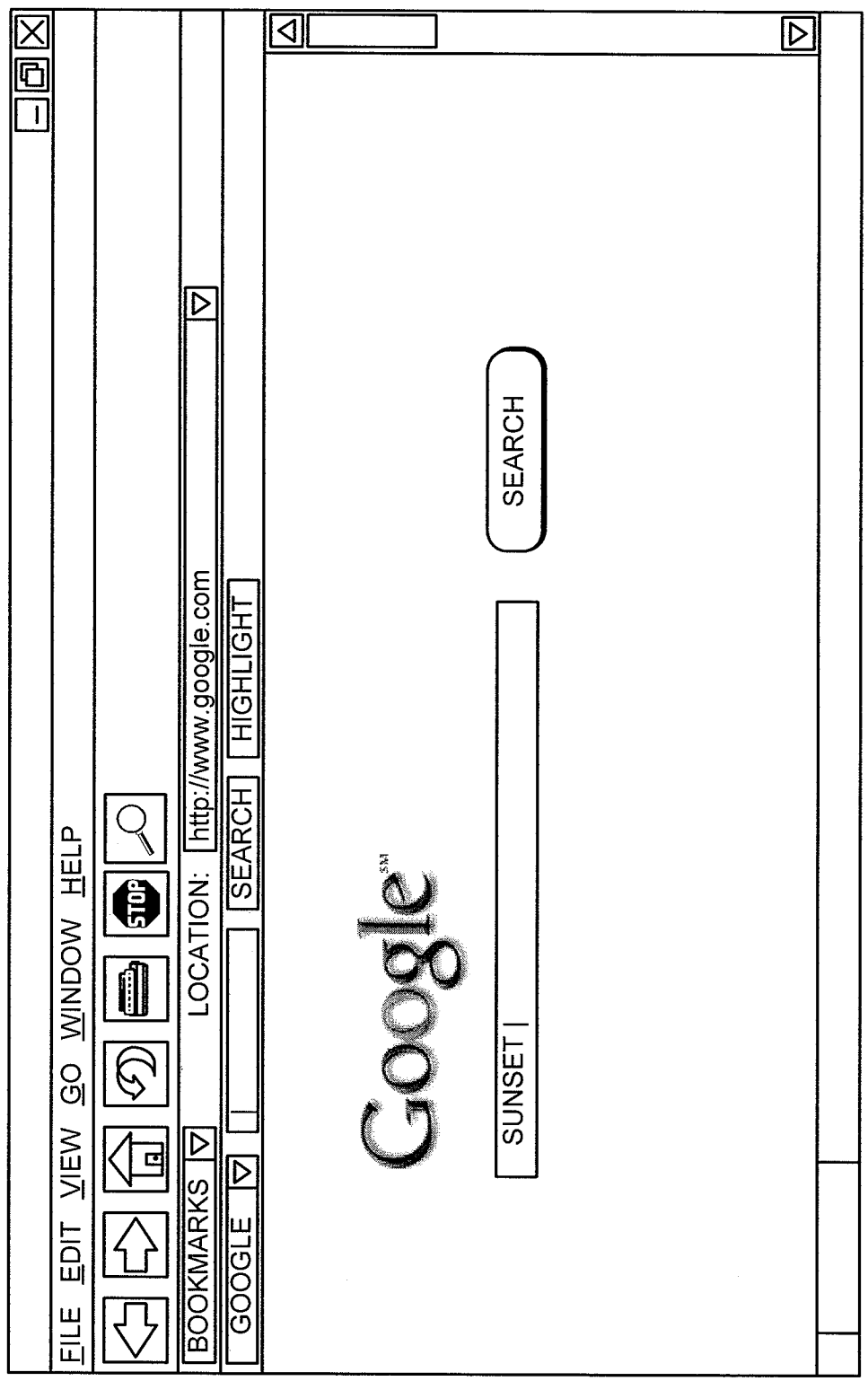

As shown in FIG. 8, assume that a user accesses an interface associated with search engine system 710. The interface may be associated with one of the repositories or none of the repositories. As shown in FIG. 8, assume that the user provides the search query "sunset" to search engine system 710. In addition to the search query, search engine system 710 may obtain information regarding the user, such as an IP address, cookie information, languages, and/or geographical information associated with the user.

In one implementation, as described above, search engine system 710 may perform a search on each of repositories 720-740 to obtain a set of search results for each of repositories 720-740. Assume that search engine system 710 identifies 10 web page results from web page repository 720, 10 image results from image repository 730, and 10 news document results from news repository 740 as relevant search results for the search query "sunset."

Search engine system 710 may input information relating to the user, the search query the user provided, and each of repositories 720-740 as inputs to the model. The model may be used to determine the probability of the user desiring information from each of repositories 720-740 when the user provides the search query "sunset."

Assume, for example, that the following outputs are generated by the model:

P(desire|u, q, show_web page repository)=0.45
P(desire|u, q, show_image repository)=0.91
P(desire|u, q, show_news repository)=0.23, where "u" refers to user information corresponding to the user that provided the search query, "q" refers to information corresponding to the search query the user provided (i.e., "sunset"), and "show_x repository" (where x corresponds to "web page," "image," or "news") refers to information corresponding to the identified repository. In this case, the probability of the user desiring information from web page repository 720 when the user provides the search query "sunset" is 45%; the probability of the user desiring information from image repository 730 when the user provides the search query "sunset" is 91%; and the probability of the user desiring information from news repository 740 when the user provides the search query "sunset" is 23%.

Search engine system 710 may then use the output of the model with regard to each of repositories 720-740 to determine whether to provide search results associated with that repository. For example, assume that a rule indicates that search engine system 710 is to provide search results only from the repository with the highest score. In this case, search engine system 710 may form a search result document based on the 10 image results identified from image repository 730 (i.e., the repository with the highest score—0.91), as shown in FIG. 9.

Alternatively, assume that a rule indicates that search engine system 710 is to always provide search results from web page repository 720 and, if another repository has an associated score higher than the score associated with web page repository 720, provide search results from that repository (or repositories). In this case, search engine system 710 may determine that it is to provide search results from both web page repository 720 and image repository 730 because the score associated with image repository 730 (0.91) is greater than the score associated with web page repository 720 (0.45).

Figure 10:
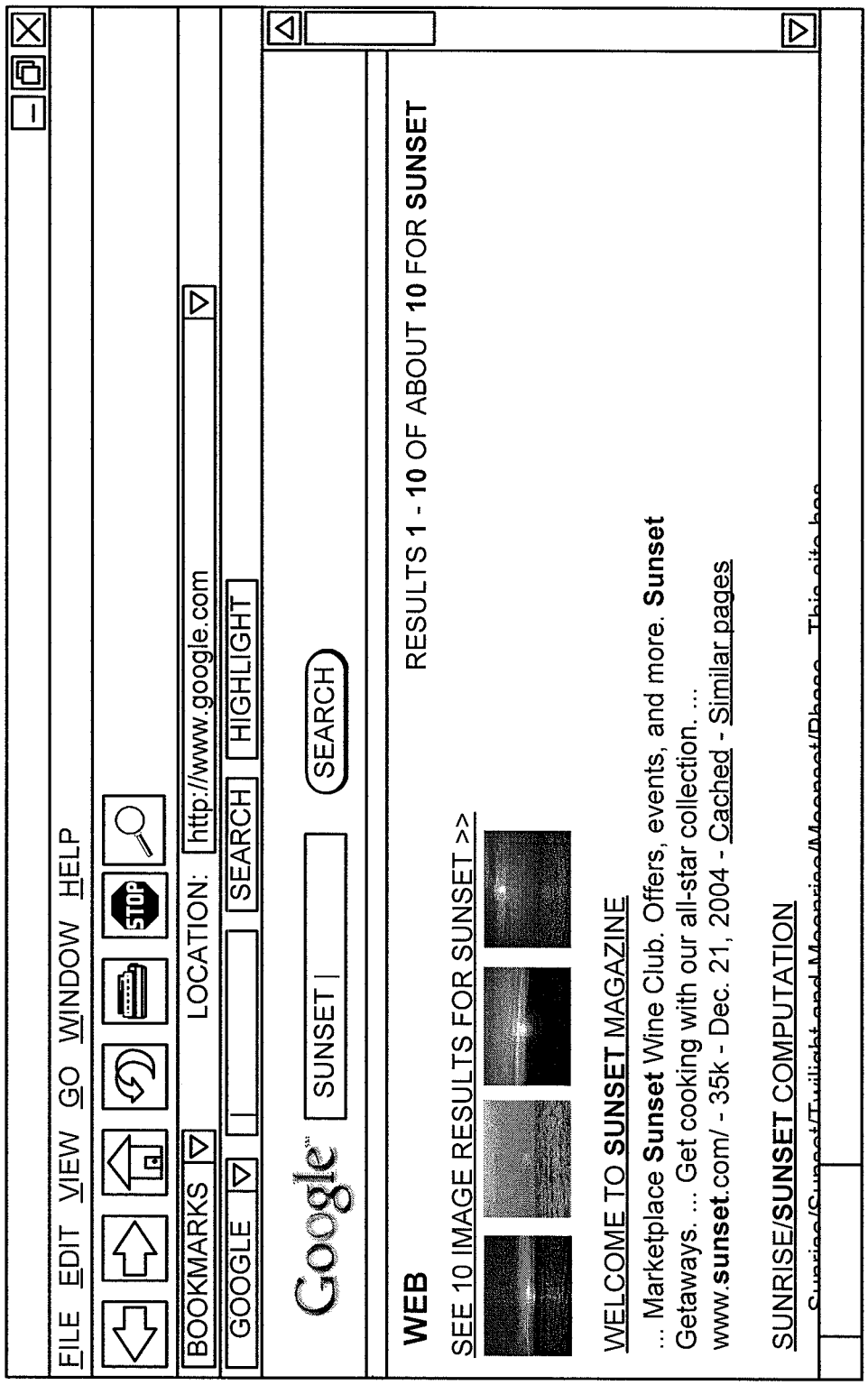

Search engine system 710 may then form a search result document based on the 10 web page results from web page repository 720 and the 10 image results from image repository 730, as shown in FIG. 10. Because the score associated with image repository 730 is higher than the score associated with web page repository 720 (or some degree higher or higher and greater than a threshold), information regarding the 10 image results may be presented in a more prominent location than the 10 web page results within the search result document, as also shown in FIG. 10. The user might select the link associated with the 10 image results (e.g., "SEE 10

Figure 9:
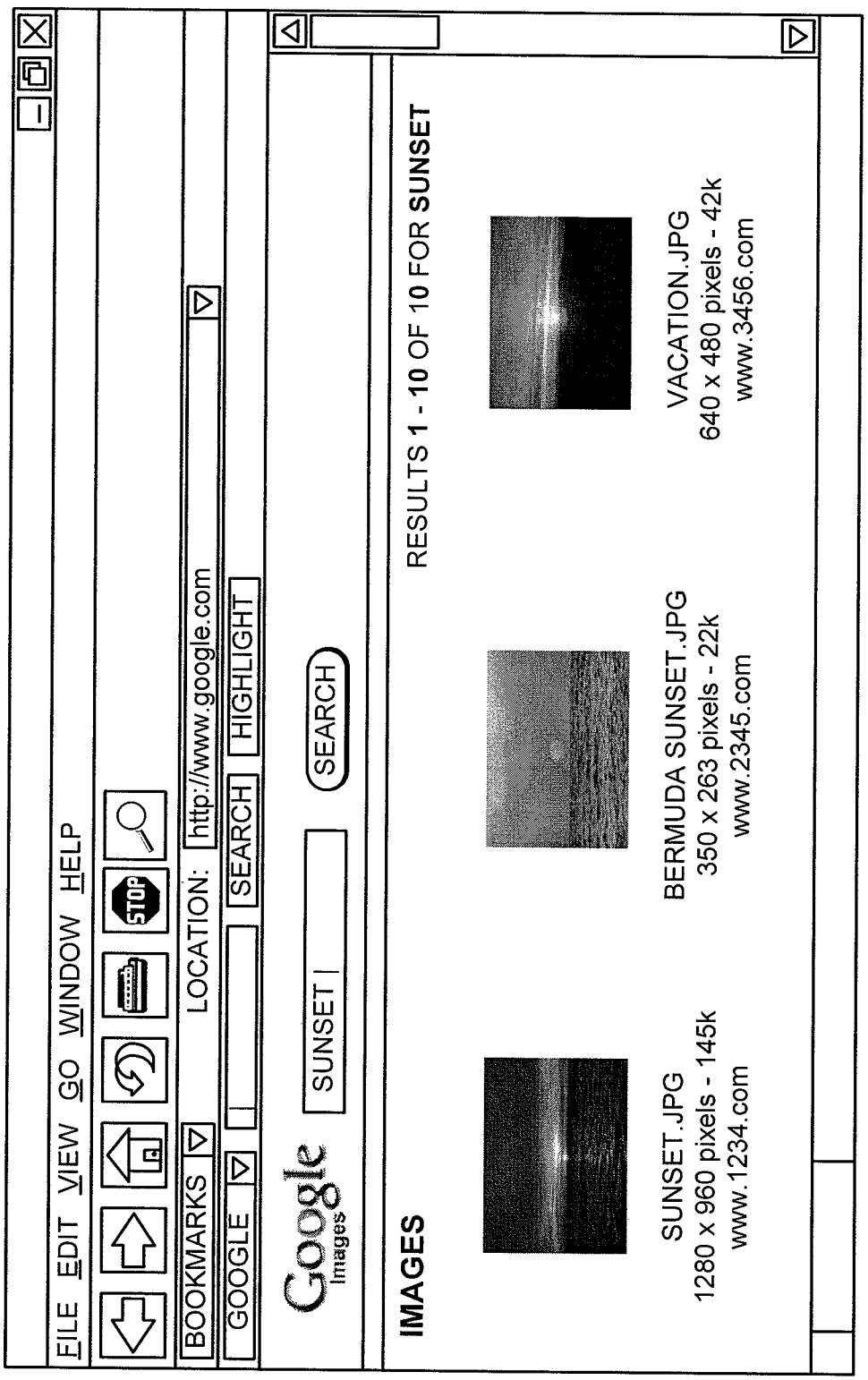

IMAGE RESULTS FOR SUNSET>>") to be presented with additional information regarding the image results, similar to that shown in FIG. 9.

CONCLUSION

Implementations consistent with the principles of the invention may generate a model that may be used to predict which repository, or repositories, a user is likely interested in when the user provides a search query, and use this model to provide relevant search results to the user.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4 and 6, the order of the acts may be modified in other implementations consistent with the principles of the invention. Further, non-dependent acts may be performed in parallel.

Also, exemplary user interfaces have been described with respect to FIGS. 8-10. In other implementations consistent with the principles of the invention, the user interfaces may include more, fewer, or different pieces of information.

The preceding description refers to a user. A "user" is intended to refer to a client, such as a client 510 (FIG. 5), or an operator of a client.

Further, it has been described that the output of the model ("score") can be used to determine whether to search a repository, whether to include search results from a repository in a search result document, and/or the manner for presenting search results within the search result document. In another implementation, the score may be used as one input, of multiple inputs, to a function that determines whether to search a repository, whether to include search results from a repository in a search result document, and/or the manner for presenting search results within the search result document.

Further, some of the features described above are more computationally expensive to determine than others. For example, features based on the documents in the repositories may require those repositories to be queried and the documents to be fetched. For computational efficiency, an approximate main model may be created based on less computationally expensive (e.g., cheaper) features and this approximate main model may be used to determine which repositories to search. Once the documents from these repositories have been fetched, the full main model may be used to determine from which repositories to provide search results.

Also, it may be possible to use the model according to an "exploration" policy in order to gather information on different repositories. For example, it may be desirable to provide search results relating to a sub-optimal repository (e.g., presenting news documents rather than images). One exploration policy may indicate that documents from a random repository be presented to a small fraction of users. Another exploration policy may indicate that documents from a repository be presented in proportion to the score (e.g., if the score for images is determined to be twice the score for news articles, then images may be presented twice as often as news articles).

It has been described that a model may be generated to identify a repository (or a set of repositories) based on a likelihood that a user desires information from the identified repository. In one implementation, the model may be constructed as a lookup table with a key determined based on one or more features, such as one or more features relating to the query (e.g., the query terms). The output of the lookup table might include a click-through rate (or estimated click-through rate) for each of the repositories. In this case, the likelihood that the user desires information from one of the repositories may be a function of the click-through rate for that repository. For example, it might be determined whether to search a repository, whether to include search results from a repository in a search result document, and/or the manner for presenting search results based on the click-through rates for the repositories.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by one or more processors, a query that includes one or more terms;
determining, by the one or more processors, a portion of other queries, that include the one or more terms, that were provided to each repository, of a plurality of repositories,
each repository storing a respective type of data, of a plurality of types of data;
determining, by the one or more processors and based on the portion of other queries that were provided to each repository, respective scores for the plurality of repositories with respect to the query,
each of the respective scores being determined based on comparing the portion of other queries that were provided to the repository to the portion of other queries that were provided to other repositories, of the plurality of repositories;
selecting, by the one or more processors and based the respective scores, one or more repositories, of the plurality of repositories; and
providing, by the one or more processors, information from the one or more repositories based on the query.

2. The method of claim 1, where selecting the one or more repositories includes:
identifying one or more scores, of the respective scores, that satisfy a threshold; and
selecting the one or more repositories based on the one or more scores satisfying the threshold.

3. The method of claim 1, where the information from a particular repository, of the one or more repositories, identifies documents associated with the particular repository, and
where a quantity of the identified documents, associated with the particular repository, is based on one of the respective scores that is determined for the particular repository.

4. The method of claim 1, where providing the information from the one or more repositories further includes:
forming a results document that includes the information from the one or more repositories; and
providing the results document to a client device associated with the query.

5. The method of claim 4, where forming the results documents further includes:
positioning, in the results document, information identifying a set of documents, associated with a repository, of the one or more repositories, based on a score, of the respective scores, determined for the repository.

6. The method of claim 1, where determining the respective scores further includes:
determining data associated with a client device associated with the query; and
determining the respective scores further based on the data associated with the client device.

7. The method of claim 1, where the query is associated with a client device, and
where the other queries are associated with a plurality of client devices that includes the client device.

8. A system comprising:
a memory; and
one or more processors to:
store, in the memory, data associated with a plurality of repositories,
each repository, of the plurality of repositories, storing a respective type of data, of a plurality of types of data,
receive a query that includes one or more terms,
determine, based on the data, a portion of other queries, that include at least one term of the one or more terms, that were provided to each repository,
determine, based on the portion of the other queries that were provided to each repository, respective scores for the plurality of repositories with respect to the query,
each of the respective scores being determined based on comparing the portion of the other queries that were provided to the repository to the portion of the other queries that were provided to other repositories of the plurality of repositories,
select, based the respective scores, one or more repositories, of the plurality of repositories, and
provide information from the one or more repositories based on the query.

9. The system of claim 8, where, when selecting the one or more repositories, the one or more processors are further to:
identify one or more scores, of the respective scores, that satisfy a threshold, and
select the one or more repositories based on the one or more scores satisfying the threshold.

10. The system of claim 8, where the information from a particular repository, of the one or more repositories, identifies documents associated with the particular repository, and
where a quantity of the identified documents, associated with the particular repository, is determined based on a particular score, of the respective scores, determined for the particular repository.

11. The system of claim 8, where the one or more processors, when providing the information from the one or more repositories, are further to:
form a results document that includes the information from the one or more repositories, and
provide the results document to a client device associated with the query.

12. The system of claim 11, where the one or more processors, when forming the results documents, are further to:
position, in the results document, information identifying a set of documents, associated with a repository, of the one or more repositories, based on a score, of the respective scores, determined for the repository.

13. The system of claim 8, where the one or more processors, when determining the respective scores, are further to:
determine data associated with a client device associated with the query, and
determine the respective scores further based on the data associated with the client device.

14. The system of claim 8, where the query is associated with a client device, and
where the other queries are associated with a plurality of client devices that includes the client device.

15. A non-transitory memory device to store instructions, the instructions comprising:
one or more instructions that, when executed by one or more processors, cause the one or more processors to:
receive a query that includes one or more terms;
determine a portion of other queries, that include the one or more terms, that were provided to each repository, of a plurality of repositories,
each repository storing a respective type of data, of a plurality of types of data;
determine, based on the portion of other queries that were provided to each repository, respective scores for the plurality of repositories with respect to the query,
one of the respective scores being determined based on comparing the portion of the other queries that were provided to the repository to the portion of the other queries that were provided to other repositories of the plurality of repositories;
select, based the respective scores, one or more repositories, of the plurality of repositories; and
provide information from the one or more repositories based on the query.

16. The non-transitory memory device of claim 15, where the one or more instructions to select the one or more repositories include:
one or more instructions to identify one or more scores, of the respective scores, that satisfy a threshold; and
one or more instructions to select the one or more repositories based on the one or more scores satisfying the threshold.

17. The non-transitory memory device of claim 15, where the provided information, from a particular repository, of the one or more repositories, identifies documents associated the particular repository, and
where a quantity of the identified documents, associated with the particular repository, is based on a particular score, of the respective scores, that is determined for the particular repository.

18. The non-transitory memory device of claim 15, where the one or more instructions to provide the information from the one or more repositories further include:
one or more instructions to form a results document that includes the information from the one or more repositories; and
one or more instructions to provide the results document to a client device associated with the query.

19. The non-transitory memory device of claim 18, where the one or more instructions to form the results document further include:

one or more instructions to position, in the results document, information identifying a set of documents, associated with a repository, of the one or more repositories, based on a score, of the respective scores, determined for the repository.

20. The non-transitory memory device of claim 15, where the query is associated with a client device, and
where the other queries are associated with a plurality of client devices that includes the client device.

* * * * *